Aug. 8, 1933.　　　　A. H. LAHM　　　　1,920,991
ARTIFICIAL LURE
Filed Feb 25, 1930

Inventor
ADAM H. LAHM
By
Attorneys

Patented Aug. 8, 1933

1,920,991

UNITED STATES PATENT OFFICE 1,920,991

ARTIFICIAL LURE

Adam H. Lahm, New Butler, Wis.

Application February 25, 1930. Serial No. 431,123

3 Claims. (Cl. 43—36)

My invention refers to artificial bait of the lure type, and it has for its object to provide a simple, effective, and economically constructed bait, which will perform its functions properly.

The specific object of the invention is to provide either a top or under water bait having a plurality of hooks concealed therein, which hooks are associated with skeleton wings which, when gripped or hit will cause the hooks to spring outwardly and securely grasp the fish.

With the above and other minor objects in view, the invention consists in certain peculiarities of construction and combination of parts as will be hereinafter set forth with reference to the accompanying drawing and subsequently claimed.

In the drawing, Figure 1 represents a sectional plan elevation of a lure embodying the features of my invention, the section being indicated by line 1—1 of Figure 3;

Figure 1:
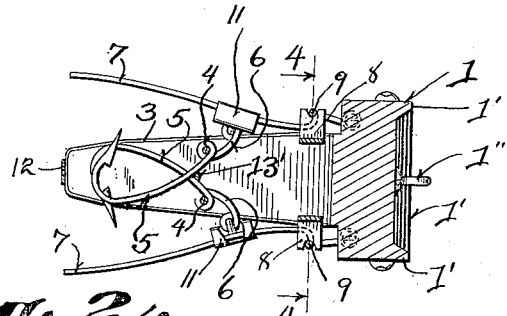

Referring by characters to the drawing, 1 represents the head portion of the lure having a body portion which is slotted longitudinally to form upper and lower sections 2 and 3, respectively.

Pivot pins 4—4 are carried by the body portion, and mounted on said pins in the longitudinal slot are a pair of hooks 5—5 extending rearwardly and having tail pieces 6—6.

Pivoted to the head portion 1 are a pair of skeleton wings 7—7, each of which wings in this exemplification of my invention comprises a pair of wires that extend rearwardly of the lure body portion and outside of the same.

These wings are spread apart by an inverted U-shaped leaf spring 8. This spring is placed over the upper surface of the body adjacent to the front end thereof and the legs depend toward the longitudinal center of the body and terminate in outwardly projecting, laterally notched ears.

As stated, each of the wing elements include upper and lower wires and these wires curve inwardly over the upper and under the lower faces of the laterally projecting lugs of the spring 8. These wires then continue forwardly and are pivotally connected to the head of the lure forwardly of the spring. The upper and lower wires are connected by a vertical connecting bar 9, which fits within the notched ends of the laterally projecting lugs of the spring. Due to the inherent resiliency of the spring, the legs thereof normally tend to spread apart, and, consequently, these legs act to urge the wing members outwardly of the sides of the body, as clearly shown in Figure 1 of the drawing.

Slidably mounted over each set of wire members of the wings, is a sleeve 11, which sleeve carries an eye 10 that pivotally engages the looped ends of the set of hooks 5—5. In view of the fact that the hooks are pivoted intermediate their ends and rearwardly of the sleeves 11, the outward swinging movement of the wings tend to hold the hooks in their collapsed, inoperative position, as shown in Figure 1.

The tail end of the body is provided with a perforated plate 12 through which is extended and guided a tail hook 13, preferably of the weedless type. The eye of the hook is secured to the body by a pin 13'. Obviously, in some instances this tail hook may be dispensed with.

The bottom surface of the body portion has extending therefrom a fluted blade 14 which blade in its travel through the water will cause the lure to vibrate horizontally, thus similating movement of a live bait.

The head of the lure is formed upon the bottom and sides thereof with a tapered rib 1', which serves to throw a spray and also to direct the travel of the lure through the water, it being understood that the configuration of the rib and head and depression may be varied, whereby the bait will travel either upon the surface of the water or a predetermined distance below said surface. The head is also provided with a line attaching eye 1".

From the foregoing description, it is obvious, under normal conditions, that when the bait is being drawn through the water, the hooks are in the position as shown in Figure 1 of the drawing, the same being nested within the confines of the upper and lower body portions, and they are held in this normal position by the spring 8, which engages the skeleton wings, thereby exerting through the tail connection of the hooks a pressure to hold said hooks in concealment.

Figure 2:
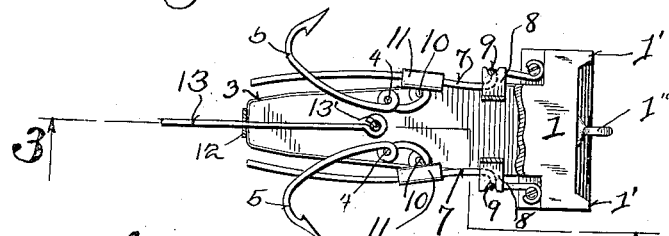
Figure 2 is a similar section showing the hooks in exposed position, this section being indicated by the line 1—2 of Figure 3.
Figure 3:
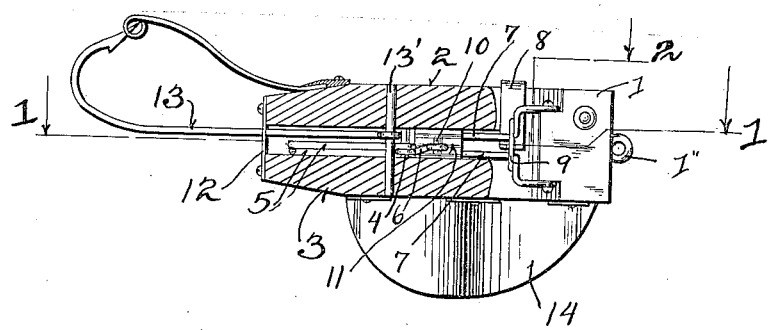
Figure 3 is a longitudinal sectional view of the lure, the section being indicated upon line 3—3 of Figure 2.
Figure 4:
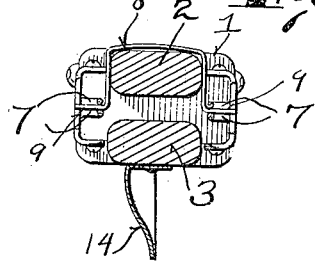
Figure 4 is a cross section of the same, the section being indicated by line 4—4 of Figure 1.

When a fish strikes the lure, it will close in upon the pair of skeleton wings and this pressure, through the hook connections, will cause said hooks to instantly spring out into the position shown in Figure 2 of the drawing, whereby the fish will be firmly snared in either direction, due to the spread of said hooks.

While I have described one specific embodiment of my invention, with respect to all details, it is understood that I may vary the same within the scope of the claims.

I claim:

1. A fishing lure comprising a body having a head portion, a pair of hooks normally housed within the body and pivoted thereto, wings pivotally secured at one end to the opposite sides of the head and extending rearwardly of the body, spring means mounted on the body and normally urging the wings laterally beyond the opposite sides of the body and means operatively connecting the hooks with the pivoted wings, whereby upon inward movement of the wings against the action of the spring, the hooks will be forced outwardly beyond the body and said wings.

2. A fishing lure comprising a longitudinally extending slotted body having a leading head portion, a pair of hooks mounted in the slot of the body and pivotally connected to the body intermediate their ends, laterally projecting wing members pivotally secured at their forward ends to the head, said wing members being arranged on opposite sides of the body, sleeves on said wing members, means pivotally connecting the inner ends of the hooks to the sleeves, and a leaf spring carried by the body having its opposite ends engaging the wing members rearwardly of their pivot points normally tending to urge the wing members outwardly beyond the body and the hooks in a collapsed position in the slotted portion of said body.

3. A fishing lure comprising a longitudinally slotted body having a leading head portion, a pair of hooks mounted in the slotted portion of the body and pivotally connected to the body intermediate their ends, wing members mounted on opposite sides of the body and pivotally connected at their forward ends to the head, sleeves secured to the wings, means pivotally connecting the inner ends of the hooks beyond their pivots to the sleeves, and an inverted U-shaped leaf spring fitted over the body directly in rear of the head having outwardly projecting notched lugs engaging the wing members on the opposite sides of the body for normally urging said wing members laterally and outwardly of the body and the hooks in a collapsed position within the slotted portion.

ADAM H. LAHM.